United States Patent
Ishikawa et al.

(10) Patent No.: US 7,298,964 B2
(45) Date of Patent: Nov. 20, 2007

(54) RECORDING SYSTEM, VIDEO CAMERA DEVICE AND VIDEO IMAGE RECORDING METHOD

(75) Inventors: Kenji Ishikawa, Osaka (JP); Takuya Sayama, Shiga (JP); Akihiko Ohtani, Osaka (JP); Toshimasa Mitsumori, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 1164 days.

(21) Appl. No.: 10/079,860

(22) Filed: Feb. 22, 2002

(65) Prior Publication Data

US 2002/0118958 A1  Aug. 29, 2002

(30) Foreign Application Priority Data

Feb. 26, 2001 (JP) ............................. 2001-049910

(51) Int. Cl.
*H04N 5/00* (2006.01)
*H04N 5/232* (2006.01)
(52) U.S. Cl. ................. 386/117; 348/211.3; 348/211.11
(58) Field of Classification Search ............ 348/211.3, 348/211.11, 218.1, 153, 159, 14.01; 386/117
See application file for complete search history.

(56) References Cited

U.S. PATENT DOCUMENTS

| | | | | |
|---|---|---|---|---|
| 5,303,050 A | * | 4/1994 | Nishimura et al. | 348/211.2 |
| 5,852,672 A | * | 12/1998 | Lu | 382/154 |
| 5,854,654 A | * | 12/1998 | Zwahlen et al. | 348/159 |
| 5,995,140 A | * | 11/1999 | Cooper et al. | 348/159 |
| 6,006,039 A | * | 12/1999 | Steinberg et al. | 396/57 |
| 6,188,431 B1 | * | 2/2001 | Oie | 348/211.5 |
| 6,864,911 B1 | * | 3/2005 | Zhang et al. | 348/42 |
| 7,027,083 B2 | * | 4/2006 | Kanade et al. | 348/159 |

FOREIGN PATENT DOCUMENTS

| | | | |
|---|---|---|---|
| JP | 61-94461 | | 5/1986 |
| JP | 2000-102073 | * | 4/2000 |

* cited by examiner

*Primary Examiner*—Thai Q. Than
*Assistant Examiner*—Gelek Topgyal
(74) *Attorney, Agent, or Firm*—McDermott Will & Emery LLP

(57) ABSTRACT

Video data recording using a plurality of video camera devices can be performed more conveniently than in the conventional technique. A video camera device working as a parent device has a signal sending/receiving function and a control function for the whole system, and a video camera device working as a child device has a signal sending/receiving function. The parent device sends synchronization data for time synchronization, and each child device performs a shooting operation in time synchronization with the parent device in accordance with the received synchronization data.

2 Claims, 7 Drawing Sheets

RECORDING SYSTEM, VIDEO CAMERA DEVICE AND VIDEO IMAGE RECORDING METHOD

BACKGROUND OF THE INVENTION

The present invention relates to a technique for a recording system for simultaneously shooting and recording images by using a plurality of video camera devices such as a video camera.

Portable movie devices and the like have recently spread so that video pictures can be shot by a variety of methods. Also, software for easily editing video data thus obtained on a personal computer has also spread.

A technique for a system for shooting pictures by using a plurality of video cameras is disclosed in Japanese Laid-Open Patent Publication No. 61-94461. This system includes a main time code transmitter for sending a time code used as a reference to each camera of the system by radio transmission. Thus, the respective cameras are mutually synchronized based on the time code, so as to ease the edit operation of recorded data.

In the conventional system, however, it is necessary to separately provide the main time code transmitter for synchronization in addition to the plural video camera devices, which disadvantageously makes it difficult for a user to conveniently enjoy shooting pictures.

Furthermore, although the video camera devices are mutually synchronized by the time code, parameters of the video camera devices themselves, such as focus, lens opening and a compression ratio of recorded images, cannot be dynamically changed. Therefore, a shooting operation cannot be performed with the respective video camera devices mutually synchronized as the whole system, and hence, this system is not very convenient.

Moreover, each video camera device is equipped with a storage device such as a tape, which increases cost and is disadvantageous in the portability and maneuverability.

SUMMARY OF THE INVENTION

An object of the invention is realizing video image recording using a plurality of camera devices more convenient than that of the conventional technique.

Specifically, the recording system of this invention comprises a plurality of video camera devices, and the plurality of video camera devices include a parent device having a signal sending/receiving function and a control function for the recording system; and at least one child device having a signal sending/receiving function, the parent device sends synchronization data for time synchronization, and the child device receives the synchronization data sent from the parent device and performs a shooting operation in time synchronization with the parent device in accordance with the synchronization data.

According to the invention, each child device performs the shooting operation in time synchronization with the parent device in accordance with the synchronization data sent from the parent device. Therefore, without separately providing a device for attaining synchronization as in the conventional technique, the shooting operation can be performed while attaining the mutual time synchronization by the video camera devices alone. Accordingly, convenience for a user can be largely improved.

In the recording system of this invention, the child device preferably includes a signal intensity detecting unit for detecting intensity of a receive signal and outputting an identification signal corresponding to whether or not the intensity of the receive signal is lowered; and a memory unit for receiving the identification signal and, when the identification signal corresponds to lowering of the intensity of the receive signal, for temporarily storing video data to be sent, so that when the intensity of the receive signal is restored, the video data stored in the memory unit can be sent.

In this manner, when the lowering of the signal intensity is detected by the signal intensity detecting unit in the child device, video data to be sent is temporarily stored in the memory unit, and after the signal intensity is restored, the stored video data is sent. Accordingly, even when the electric field is weakened, each child device can definitely send video data to the parent device.

Alternatively, the recording system of this invention comprises a plurality of video camera devices, and the plurality of video camera devices include a parent device having a signal sending/receiving function and a control function for the recording system; and at least one child device having a signal sending/receiving function, and the parent device has a function to store video data received from the child device as well as video data taken by the parent device.

According to the invention, the parent device stores the video data of the child device as well as the video data of itself, and thus, the parent device collectively has the function to store the video data. Therefore, there is no need for the child device to have the storing function, and a storage device conventionally provided in the child device can be omitted. Accordingly, the child device can be downsized, so as to lower the cost and improve the portability and maneuverability.

Alternatively, the recording system of this invention comprises a plurality of video camera devices, and the plurality of video camera devices include a parent device having a signal sending/receiving function and a control function for the recording system; and at least one child device having a signal sending/receiving function, the parent device sends, as control information, an operation parameter for defining operation specification of the child device, and the child device receives the operation parameter sent from the parent device and performs a shooting operation with the operation specification thereof set in accordance with the operation parameter.

According to the invention, each child device performs the shooting operation with the operation specification thereof set in accordance with the operation parameter sent from the parent device. Therefore, the shooting operations of the respective video camera devices can be performed in cooperation as the whole system while dynamically changing the operation specification of each video camera device working as the child device.

Also, one aspect of the invention is a video camera device used as the parent device in any of the aforementioned recording systems.

Another aspect of the invention is a video recording method executed in any of the aforementioned recording systems.

DETAILED DESCRIPTION OF THE INVENTION

A preferred embodiment of the invention will now be described with reference to the accompanying drawings.

Figure 1:
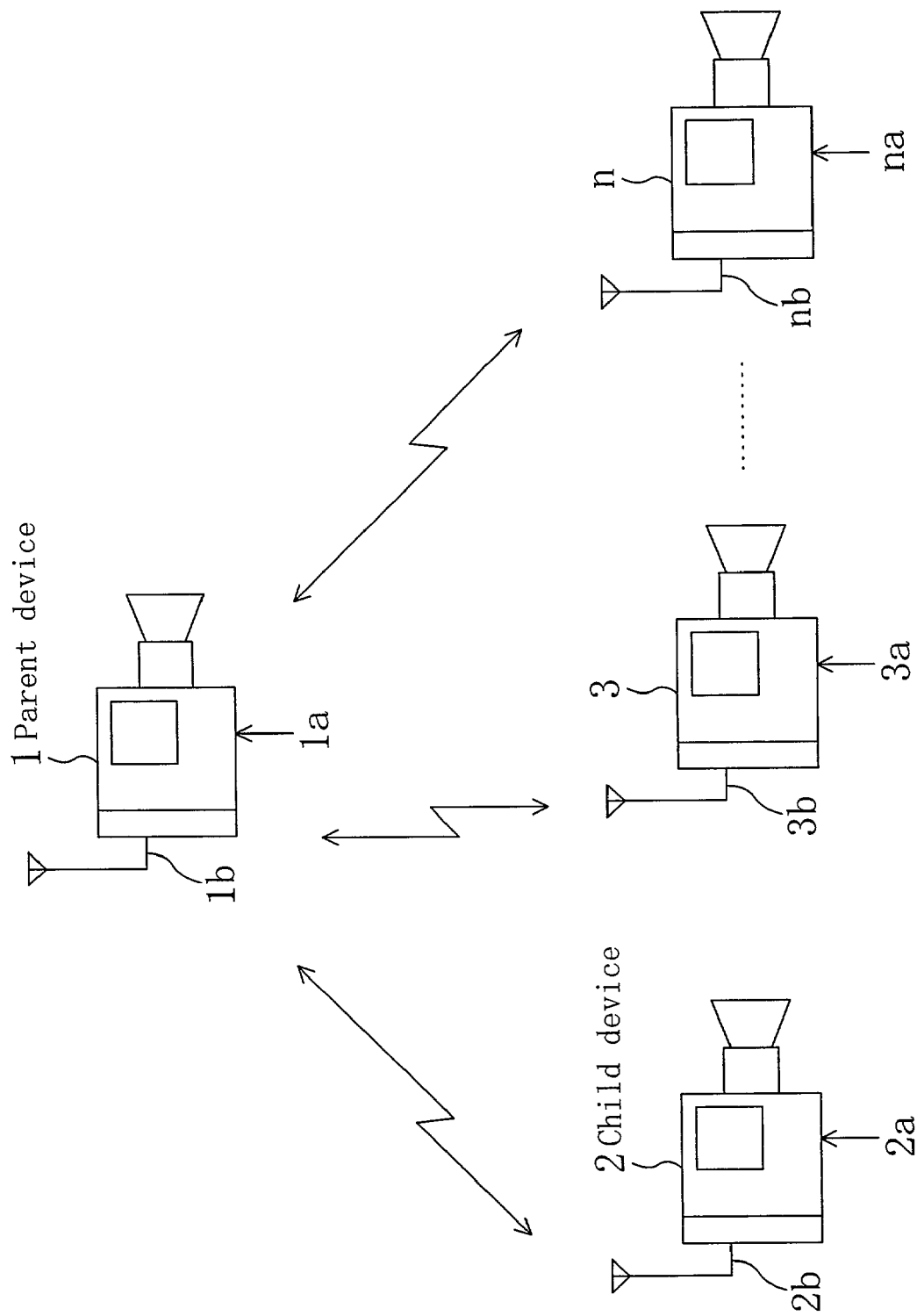
FIG. 1 is a diagram of the structure of a recording system including a plurality of video camera devices according to one embodiment of the invention.

FIG. 1 shows the structure of a recording system including a plurality of video camera devices according to this embodiment. In FIG. 1, each of reference numerals 1, 2, 3, . . . and n denotes a video camera device having both a video camera function and a signal sending/receiving function using radio transmission. The video camera device 1 also has a control function for this recording system and works as a parent device with the other video camera devices 2, 3, . . . and n working as child devices. It is noted that n is a number determined based on the number of child devices set in this recording system.

Figure 2:
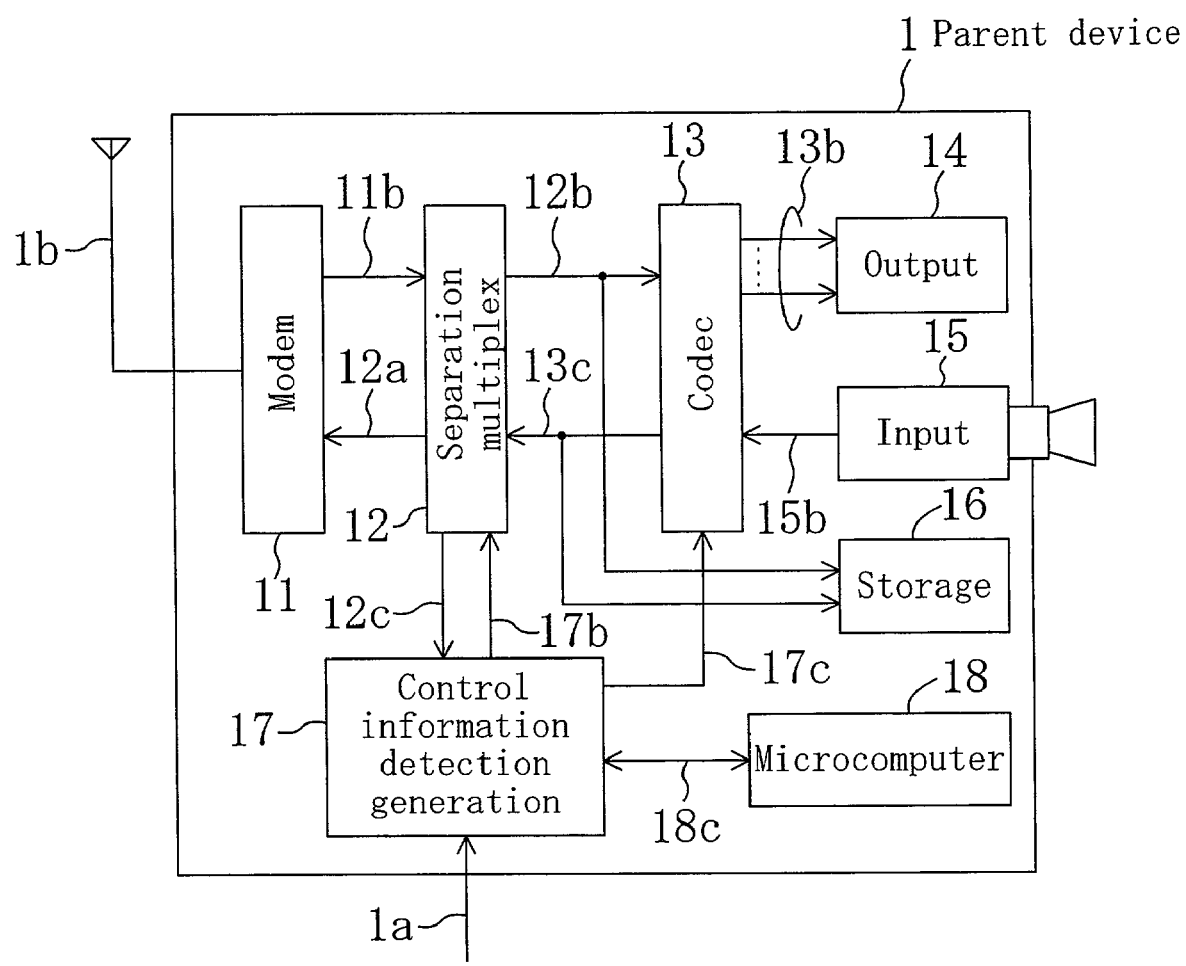
FIG. 2 is a diagram of an example of the internal structure of a video camera device serving as a parent device.
Figure 3:
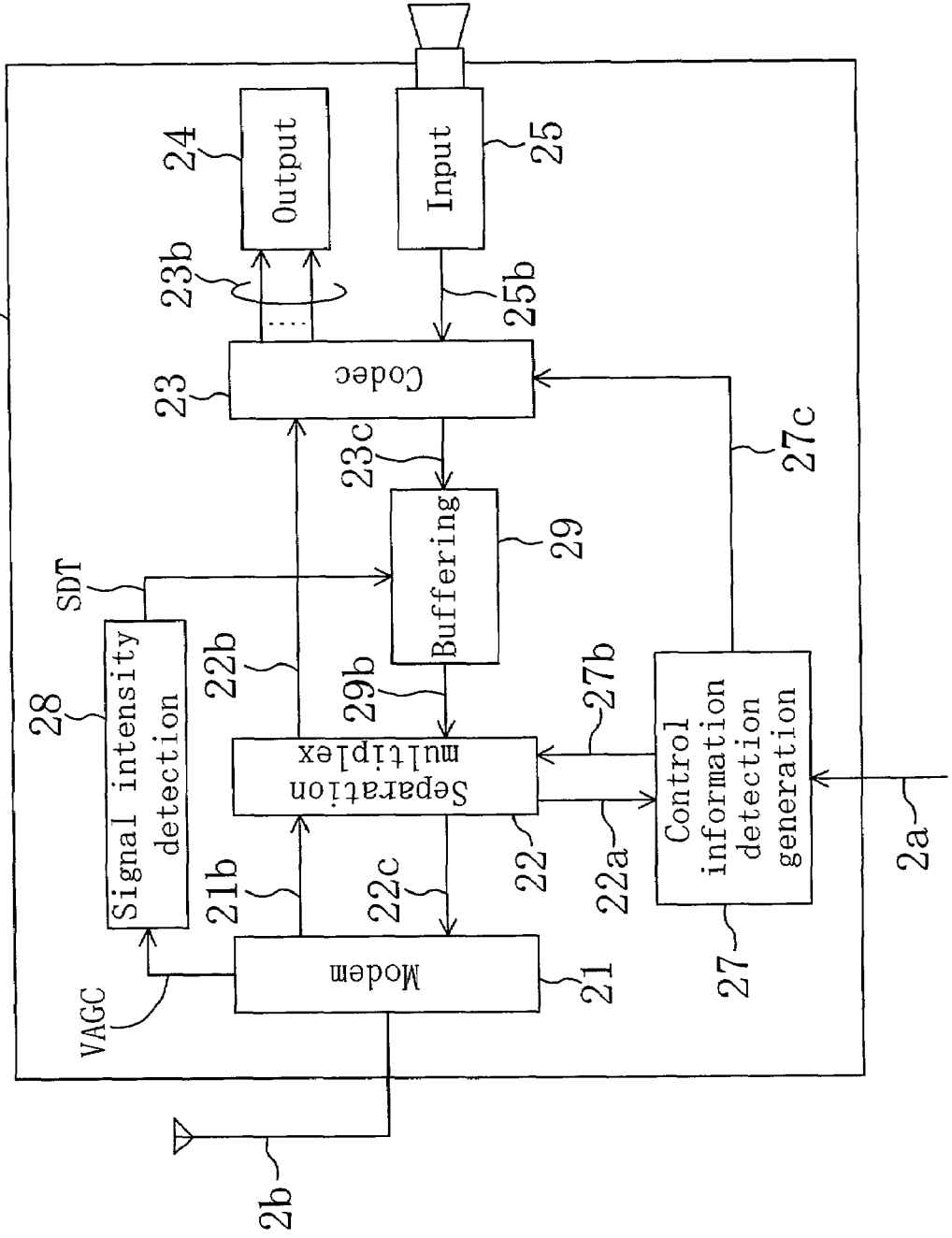
FIG. 3 is a diagram of an example of the internal structure of a video camera device serving as a child device.

FIG. 2 shows the internal structure of the video camera device 1 working as the parent device, and FIG. 3 shows the internal structure of the video camera device 2 working as the child device. In FIG. 2, a modem unit 11 demodulates a receive signal from a sending/receiving antenna 1b so as to output a demodulation signal 11b in a receive operation and modulates multiplex system data 12a so as to output a modulation signal to the sending/receiving antenna 1b in a send operation.

A separation multiplex unit 12 receives the demodulation signal 11b output from the modem 11 so as to separate multiplexed video data and control information data for outputting separated audio video (AV) data 12b and separated control information data 12c, and receives encoded video data 13c and system control information data 17b and performs multiplex processing in accordance with the employed signal sending/receiving method so as to output the multiplex system data 12a.

A codec unit 13 receives and decodes the separated AV data 12b output from the separation multiplex unit 12 so as to output decoded video output signal 13b to an output unit 14, and receives and encodes shot image data 15b from an input unit 15 (such as a camera and a microphone) so as to output the encoded video data 13c to the separation multiplex unit 12. The processing by the codec unit 13 may be performed by any method such as MPEG.

A storage unit 16 records both the encoded video data 13c output from the codec unit 13 and the separated AV data 12b (AV data sent from the respective child devices) separated by the separation multiplex unit 12. The storage unit 16 is specifically composed of, for example, a DVD-RAM, an HDD or the like.

A control information detecting generating unit 17 receives the separated control information data 12c output from the separation multiplex unit 12 and detects control information necessary for the system control so as to output detected control information 17c, and receives function operation information 1a from the system and a control signal 18c from a microcomputer 18 so as to output the system control information data 17b to the separation multiplex unit 12. The microcomputer 18 controls the whole system by referring to the control signal 18c.

The internal structure of the child device shown in FIG. 3 is substantially the same as the internal structure of the parent device of FIG. 2 except that the microcomputer and the storage unit are not included. Since the parent device has a function to control the whole recording system in this embodiment, the child device does not include the microcomputer. Also, since the parent device has a function to store all the video data taken by itself and by the child devices, there is no need to always provide the storage unit in each child device. A signal intensity detecting unit 28 and a buffering unit 29 of FIG. 3 will be described later.

It is assumed in this embodiment that the recording system includes two child devices. Specifically, it is assumed that the recording system of this embodiment includes the three video camera devices, that is, the parent device 1 and the child devices 2 and 3.

Also, it is assumed in this embodiment that time division multiplex is employed as the signal sending/receiving method. However, in the case where this recording system is actually built, any signal sending/receiving method (such as separation multiplex and a modulation demodulation method) optimal for the ambient circumstances of the system can be selected.

Figure 4:
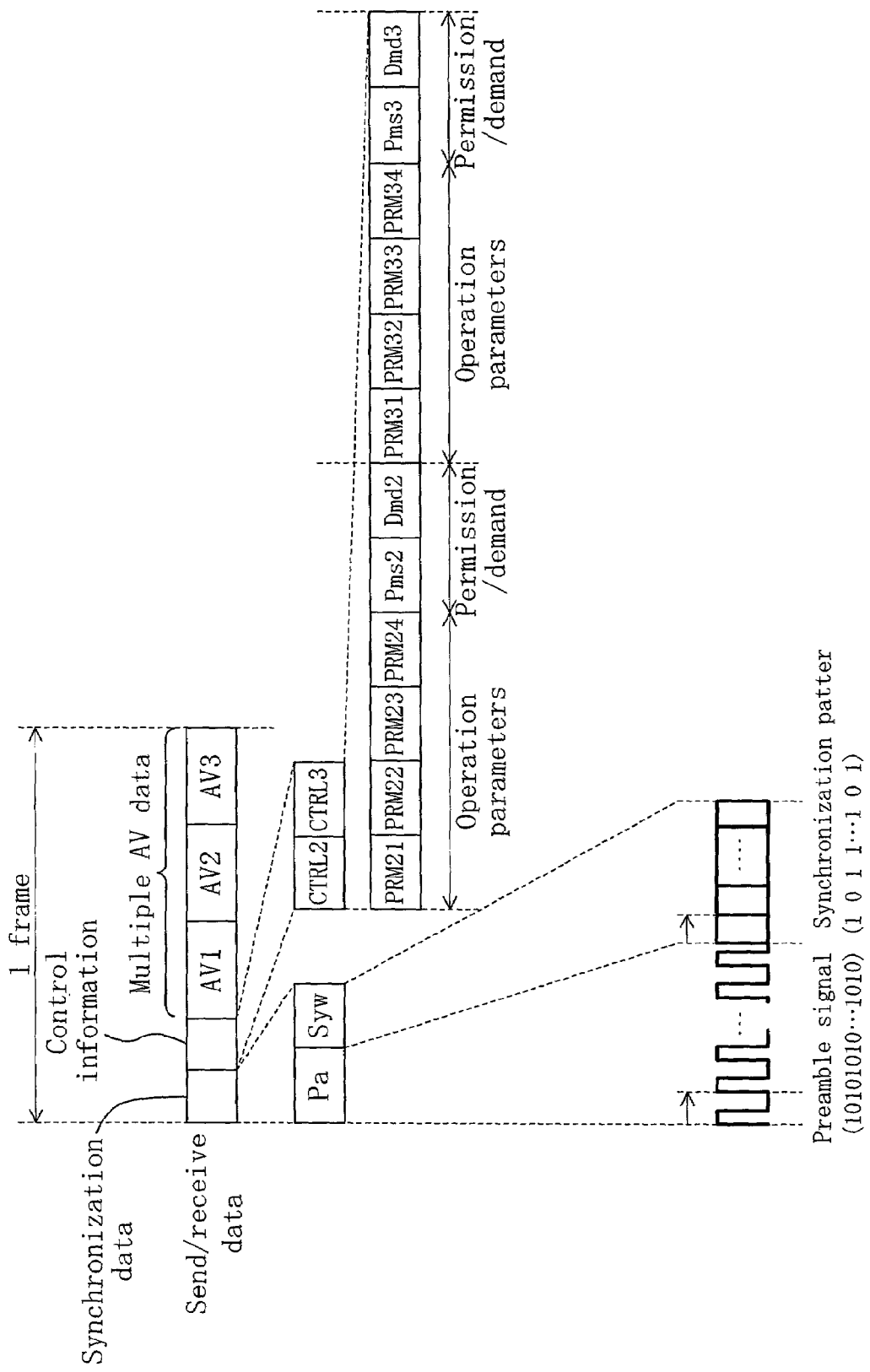
FIG. 4 is a diagram of a frame format of send/receive data used in the embodiment of the invention.

FIG. 4 shows an example of a frame data format of send/receive data. In the format of FIG. 4, frame data includes synchronization data used for attaining time synchronization, control information and multiplex AV data.

(Synchronization Data)

First, the parent device 1 sends the synchronization data, that is, a preamble signal Pa and a synchronization pattern Syw, at the top of each frame for attaining the synchronization of the whole system. Specifically, the control information detecting generating unit 17 generates the synchronization data as the system control data 17b on the basis of time information managed by the microcomputer 18. This synchronization data is subjected to the time division multiplex by the separation multiplex unit 12 and the resultant is modulated by the modem 11 so as to be sent to the child devices 2 and 3.

The preamble signal Pa is a signal alternately having a value of "1" and "0" and including a clock component of the system. This preamble signal Pa works as a reference signal by which the child devices 2 and 3 adjust their clock phase to that of the parent device 1. Specifically, the child devices 2 and 3 perform clock regeneration on the basis of this preamble signal Pa.

The synchronization pattern Syw is a unique bit pattern of "1" and "0" set by the system and is distinguishable from multiplex data.

The child devices 2 and 3 are in a receive state at the start of the system, and perform the clock regeneration of the system based on the preamble signal Pa in their modems 21 so as to synchronize their clock phase with that of the parent device 1. Furthermore, the synchronization pattern Syw is detected by separation multiplex units 22 of the child devices by using the phase synchronized clock, so as to establish frame synchronization of the system.

After establishing the frame synchronization, in a receive state, the child devices 2 and 3 can respectively separate control information CTRL2 and CTRL3 (operation parameters and change permission signals) corresponding to separated control information data 22a and multiplex AV data AV1, AV2 and AV3 as the separated AV data 22b from the demodulation signal 21b. Also, in a send state, the child devices 2 and 3 can respectively subject the control information CTRL2 and CTRL3 (change demand signals) corresponding to system control information 27b and multiplex AV data AV2 or AV3 as the encoded video data 29b (23c) to the time division multiplex.

(Control Information)

The operation modes of the child devices 2 and 3 are determined in accordance with the control information CTRL2 and CTRL3 multiplexed from the parent device 1. The control information CTRL2 and CTRL3 include operation parameters PRM21 through PRM24 and PRM31 through PRM34, change permission signals Pms2 and Pms3 and change demand signals Dmd2 and Dmd3.

The operation parameters are data for defining the operation specification of each of the child devices 2 and 3. Specifically, the operations parameters are, for example, parameters relating to an audio video signal, video edition and system control, such as a focal length of the camera, lens opening and white balance, a coding compression ratio of video data, a multiplex rate and multiplex time, differentiation between a still image and a dynamic image, and presence of voice. Apart from these parameters, various parameters such as system time, a camera angle and a video image field may be the operation parameters.

In the case where the operation parameters are desired to change during the shooting operation of each of the child devices 2 and 3, it is necessary to demand the change of the parent device 1. This change demand is realized by the child devices 2 and 3 respectively sending the change demand signals Dmd2 and Dmd3 corresponding to the content of the change to the parent device 1.

The parent device 1 receives the change demand signals Dmd2 and Dmd3 respectively sent from the child devices 2 and 3. The parent device 1 determines whether or not it permits the change corresponding to the received change demand signals Dmd2 and Dmd3. When the change is permitted, the parent device 1 sends, in a time division multiplex manner, the change permission signals Pms2 and Pms3 and the operation parameters PRM21 through PRM24 and PRM31 through PRM34 for defining the operation specifications of the child devices 2 and 3 to be employed after the permitted change in a next frame.

The child devices 2 and 3 respectively receive the change permission signals Pms2 and Pms3 from the parent device 1, and change their operation specifications according to the received signals on occasion.

(Description of Operation)

Figure 5:
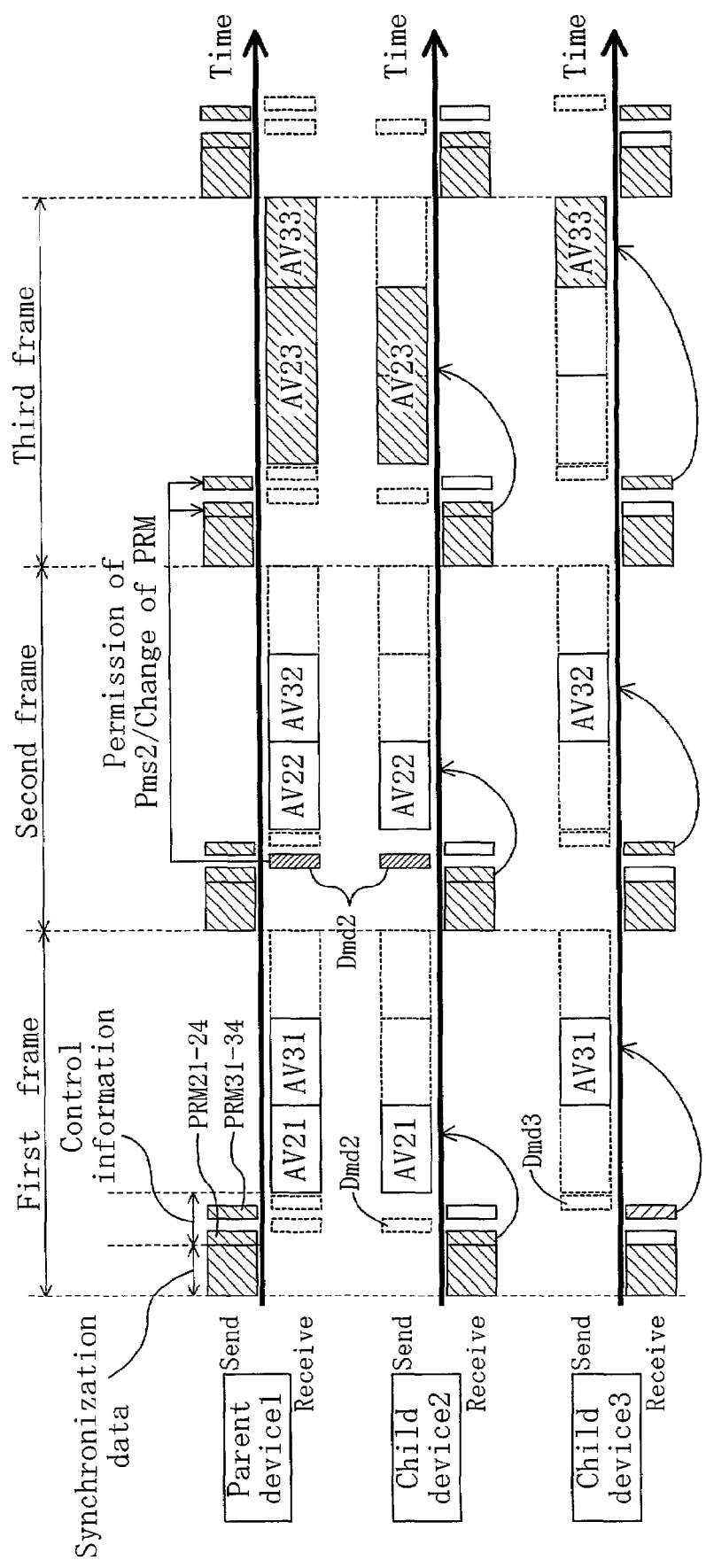
FIG. 5 is a diagram for showing a send/receive operation performed between the parent device and the child device in the embodiment of the invention.

In this manner, the child devices 2 and 3 perform the shooting operation after the establishment of the frame synchronization while mutually communicating with the parent device 1 by using the control information CTRL2 and CTRL3. FIG. 5 is a timing chart for schematically showing an example of the send/receive operation performed between the parent device 1 and the child devices 2 and 3 after the establishment of the frame synchronization. Referring to FIG. 5, the operation of the recording system of this embodiment will now be described. In FIG. 5, a time slot AV1 for AV data of the parent device 1 is not shown because it is not directly concerned with the send/receive operation between the parent device 1 and the child devices 2 and 3.

<First Frame>

After the establishment of the frame synchronization, in the first frame, the parent device 1 first generates the operation parameters PRM21 through PRM24 and PRM31 through PRM34 of the child devices 2 and 3 as the system control information data 17b by the control information detecting generating unit 17, subjects the generated data to the time division multiplex by the separation multiplex unit 12, demodulates and sends the resultant data by the modem 11. In this first frame, the change demand signals Dmd2 and Dmd3 to the parent device 1 from the child devices 2 and 3 are not generated.

The child devices 2 and 3 respectively detect the operation parameters PRM21 through PRM24 and PRM31 through PRM34 in the control information CTRL2 and CTRL3 by their control information detecting generating units 27. The detected operation parameters PRM21 through PRM24 and PRM31 through PRM34 are output as the detected control information 27c, so that processing according to the operation specifications defined by the respective operation parameters can be executed. Specifically, the child device 2 sends data resulting from the time division multiplex of the encoded AV data 29b (data AV21) to a time slot AV2 allocated in accordance with the operation parameters PRM21 through PRM24. On the other hand, the child device 3 sends data resulting from the time division multiplex of the encoded AV data 29b (data AV31) to a time slot AV3 allocated in accordance with the operation parameters PRM31 through PRM34.

The parent device 1 separates the data (AV21 and AV31) received in the time slots AV2 and AV3 respectively allocated to the child devices 2 and 3 as the separated AV data 12b from the demodulation signal 11b, so as to store them in the storage unit 16.

<Second Frame>

In the next second frame, it is assumed that the child device 2 demands high quality recording. In this case, since the size of video data of the child device 2 increases, it is necessary to increase the multiplex time, namely, elongate the period of the time slot AV2. Accordingly, the child device 2 generates the change demand signal Dmd2 corresponding to the increase of the multiplex time by the control information detecting generating unit 27, and sends the signal in a time division multiplex manner. Then, the child device 2 waits for the change demand permitted or not by the parent device 1 until the next frame.

The parent device 1 separates the change demand signal Dmd2 of the child device 2 from the demodulation signal 11b and detects the content of the change by the control information detecting generating unit 17. Then, the microcomputer 18 determines in consideration of consistency in the whole system whether or not the change demand can be granted. When the detected change is permitted, the change permission signal Pms2 to the child device 2 is prepared, and with respect to the operation parameters PRM21 through PRM24 and PRM31 through PRM34 of the child devices 2 and 3, parameters concerned with the change of the multiplex time are prepared to change.

The child devices 2 and 3 are operated in accordance with the same operation parameters as those employed in the first frame. Specifically, the child device 2 sends data resulting from the time division multiplex of the encoded AV data 29b (data AV22) to the time slot AV2 allocated in accordance with the operation parameters PRm21 through PRM24, and the child device 3 sends data resulting from the time division multiplex of the encoded AV data 29b (data AV32) to the time slot AV3 allocated in accordance with the operation parameters PRM31 through PRM34.

<Third Frame>

In the next third frame, it is assumed that the parent device 1 permits the change demanded by the child device 2 in the second frame. In the parent device 1, the control information detecting generating unit 17 generates the change permission signal Pms2 to the child device 2 and the operation parameters PRM21 through PRM24 and PRM31 through PRM34 of the child devices 2 and 3 having been changed for attaining the consistency between the change in the child device 2 and the whole system. The control information including the change permission signal Pms2 and the operation parameters PRM21 through PRM24 and PRM31 through PRM34 is sent after being subjected to the time division multiplex as the system control information data 17b by the separation multiplex unit 12.

The child device 2 recognizes the change permission signal Pms2 in the control information CTRL2 detected by the control information detecting generating unit 27 and confirms that the change demanded in the previous second frame has been permitted. Since the change has been permitted, the operation parameters PRM21 through PRM24 are detected and the operation specification defined by the operation parameters is output as the detected control information 27c. The separation multiplex unit 22 performs the time division multiplex of the encoded video data 29b (23c) (data AV23) in the time slot AV2 that has been elongated by the parameter change.

The child device 3 detects the operation parameters PRM31 through PRM34 by the control information detecting generating unit 27, and outputs the operation specification defined by the operation parameters as the detected control information 27c. The separation multiplex unit 22 performs the time division multiplex of the encoded video data 29b (23c) (data AV33) in the time slot AV3 whose start and end are shifted in time due to the parameter change.

In this manner, according to the recording system of this embodiment, each child device can perform the shooting operation in time synchronization with the parent device in accordance with synchronization data sent from the parent device. Accordingly, video data respectively recorded by the parent device and the child device are all in time synchronization, and hence, there is no need to adjust frames and fields in editing the video data, which remarkably improves the efficiency in the editorial work.

Also, in this embodiment, each child device performs the shooting operation with its operation specification defined in accordance with the operation parameters sent from the parent device. Specifically, the operation specification of each child device can be defined and changed by the parent device in consideration of the consistency in the whole system, and therefore, a variety of functions suitable to the system can be dynamically realized by changing the combination of operation parameters.

Furthermore, in this embodiment, since the parent device has the function to store the video data received from each child device in addition to its own video data, there is no need to provide a storage device in each child device. Therefore, the child device can be further downsized, which can improve the portability and is advantageous in cost. Needless to say, the child device may include a storage device. In this case, the storage device can be used as, for example, a backup or a temporary buffer.

<Countermeasure Against Lowering of Signal Intensity>

For example, when the camera angle is momentarily shifted during the shooting operation, data should be temporality sent/received with weak electric field. In this case, the signal intensity of video data sent from the child devices 2 and 3 to the parent device 1 is temporality lowered. As countermeasure against this lowering of the signal intensity, the child device 2 includes the signal intensity detecting unit 28 and the buffering unit 29 as shown in FIG. 3. The structures and the operations of these units will now be described.

Figure 6:
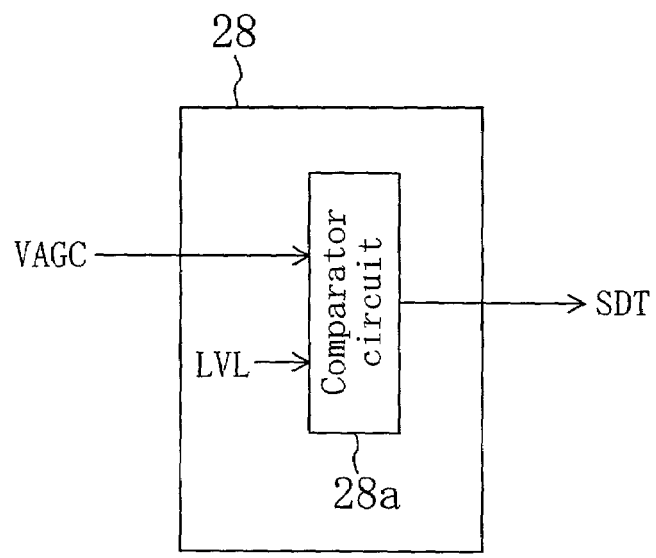
FIG. 6 is a diagram of the structure of a signal intensity detecting unit included in the child device of FIG. 3.

FIG. 6 is a diagram of an exemplified structure of the signal intensity detecting unit 28. In FIG. 6, a comparator circuit 28a receives, from the modem 21, information relating to the receive electric field, such as an automatic gain control (AGC) voltage VAGC, as one input and also receives an electric field level LVL previously set in the system as another input, and compares the two inputs with each other so as to output the comparison result as an identification signal SDT. Since the modem 21 changes the magnitude of the gain in accordance with the strength of the electric field at the sending/receiving antenna 2b so as to keep constant the demodulation signal level, the AGC voltage VAGC is also changed in accordance with the signal intensity. Therefore, when the electric field level LVL is set to a voltage value between the standard field and the weak field, the lowering of the signal intensity can be detected. It is assumed in this case that the AGC voltage VAGC and the electric field level LVL are always compared with each other so that the identification signal SDT can become "H" corresponding to the lowering of the signal intensity when the AGC voltage VGAC is lower than the electric field level LVL.

Figure 7:
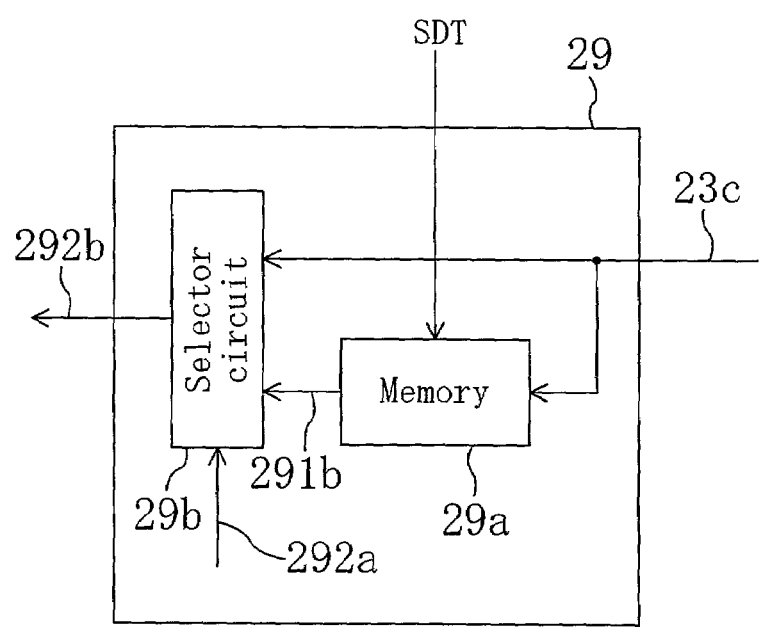
FIG. 7 is a diagram of the structure of a buffering unit included in the child device of FIG. 3.

FIG. 7 is a diagram of an exemplified structure of the buffering unit 29 serving as a memory unit. In FIG. 7, a memory 29a buffers the encoded video data 23c so as to output stored video data 291b, and when the identification signal SDT output by the signal intensity detecting unit 28 becomes "H", the memory 29a stores data from the previous frame to several frames ahead. A selector circuit 29b receives the encoded video data 23c and the stored video data 291b as inputs and selects one of the data in accordance with a selection signal 292a from the system for outputting the selected data as selected video data 292b.

Figure 8:
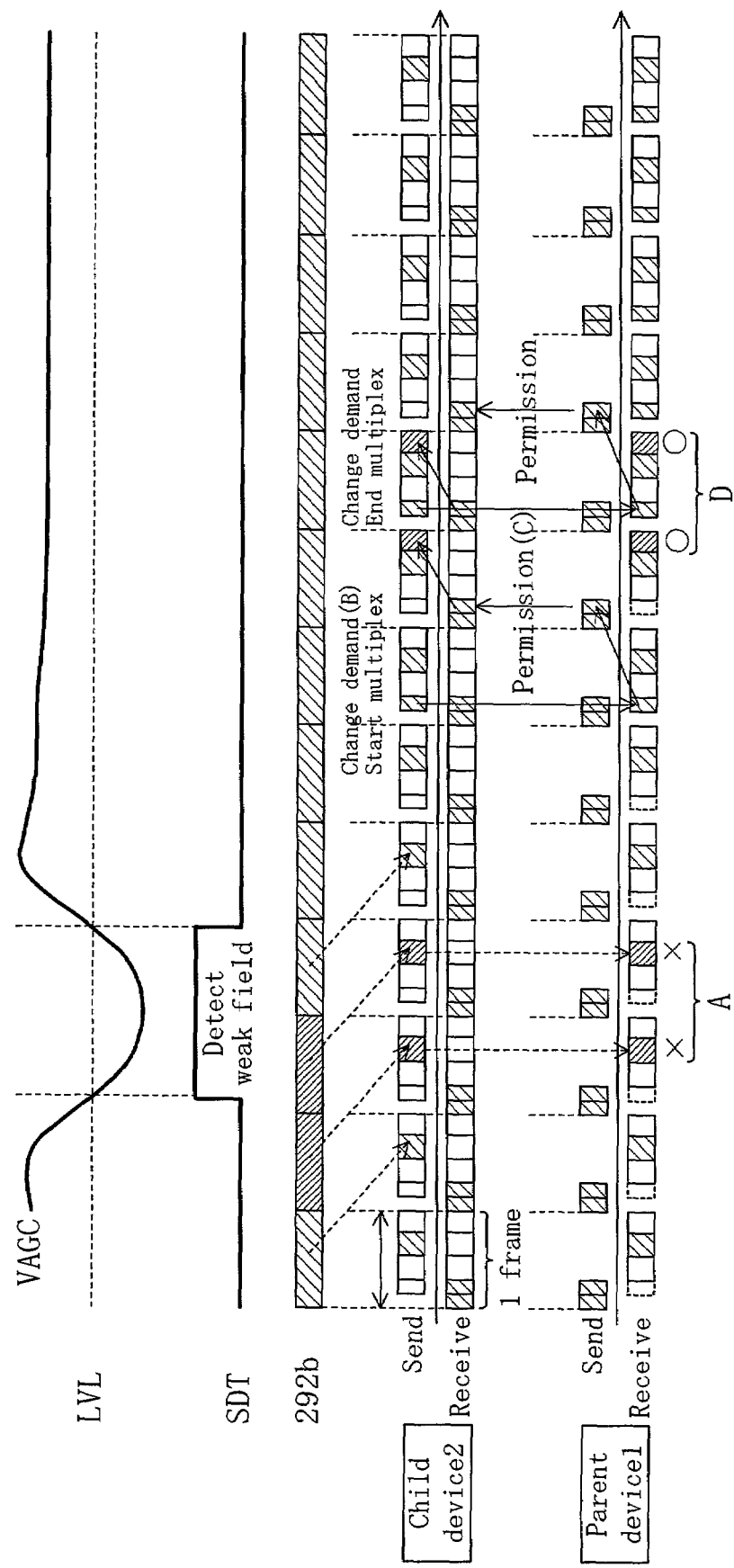
FIG. 8 is a diagram for showing an example of a send/receive operation performed between the parent device and the child device when lowering of signal intensity is detected.

FIG. 8 is a diagram of an example of the send/receive operation performed between the parent device and the child device when the lowering of the signal intensity is detected. As shown in FIG. 8, in the case where the signal intensity is lowered due to the weak field, there is increasing possibility of occurrence of any error in the demodulation, separation and encoding processing of AV data sent from the child device 2 to the parent device 1 (as shown in a portion A in the drawing). Accordingly, in order to more definitely record the AV data, the stored video data 291b stored in the memory 29a during the period of the weak field is selected in accordance with the selection signal 292a from the system so as to be multiplexed as the selected video data 292b. Thus, the data can be more definitely recorded.

In the example shown in FIG. 8, when the electric field restores from the weak field to the general field so as to cancel the lowering of the signal intensity, the child device 2 demands the parent device 1 of the increase of the multiplex time (as shown in a portion B). When this change is permitted (as shown in a portion C), the stored video data 291b is sent in a time division multiplex manner subsequently to the encoded video data 23c of the current frame. Thus, the AV data can be definitely recorded (as shown in a portion D).

Also, with respect to significant pictures for a user, after restoring to the general field, the stored video data 291b may be forcedly multiplexed in accordance with the selection signal 292a from the system instead of the encoded video data 23c of the current frame.

Although the time division multiplex is employed for the send/receive operation between the parent device and the child device in this embodiment, another method such as frequency division multiplex may be employed instead.

Furthermore, although the send/receive operation between the parent device and the child device is performed through radio transmission in this embodiment, it goes without saying that cable transmission may be used. In this case, the send/receive operation can be performed, for example, through the internet, or the invention may be applied to a monitoring camera.

As described so far, according to the invention, a shooting operation can be performed by video camera devices that are mutually synchronized in time with each other without separately providing a device for synchronization, so that the convenience for a user can be largely improved. Furthermore, since the parent device collectively has the function to store video data, the child device can be downsized, so as to lower the cost and improve the portability and maneuverability. Moreover, the video camera devices can perform their shooting operations in cooperation as the whole recording system with the operation specification of each video camera device dynamically changed.

What is claimed is:

1. A recording system comprising a plurality of video camera devices, wherein said plurality of video camera devices include:
    a parent device having a signal sending/receiving function and a control function for said recording system; and
    at least one child device having a signal sending/receiving function,
    said parent device sends synchronization data for time synchronization which includes a synchronization pattern for establishing frame synchronization, and
    said child device receives said synchronization data sent from said parent device and performs a shooting operation in time synchronization with said parent device in accordance with said synchronization data,
    wherein said parent device sends, as control information, an operation parameter for defining operation specification of said child device, and
    said child device receives said operation parameter sent from said parent device and performs the shooting operation with said operation specification thereof set in accordance with said operation parameter,
    wherein when said operation specification of said child device is to be changed, said child device sends a change demand signal corresponding to a content of change as said control information, and
    said parent device receives said change demand signal sent from said child device, determines whether or not the content of change corresponding to said change demand signal is permitted, and when the change is permitted, sends a change permission signal and an operation parameter for defining operation specification to be employed by said child device after the change.

2. A recording system comprising a plurality of video camera devices,
    wherein said plurality of video camera devices include:
        a parent device having a signal sending/receiving function and a control function for said recording system; and
        at least one child device having a signal sending/receiving function,
    said parent device sends, as control information, an operation parameter for defining operation specification of said child device, and
    said child device receives said operation parameter sent from said parent device and performs a shooting operation with said operation specification thereof set in accordance with said operation parameter,
    wherein when said operation specification of said child device is to be changed, said child device sends a change demand signal corresponding to a content of change as said control information, and
    said parent device receives said change demand signal sent from said child device, determines whether or not the content of change corresponding to said change demand signal is permitted, and when the change is permitted, sends a change permission signal and an operation parameter for defining operation specification to be employed by said child device after the change.

* * * * *